(12) United States Patent
Lim

(10) Patent No.: US 8,385,343 B2
(45) Date of Patent: Feb. 26, 2013

(54) METHOD AND APPARATUS FOR SEARCHING IP ADDRESS

(75) Inventor: Hyesook Lim, Seoul (KR)

(73) Assignee: EWHA University Industry Collaboration Foundation (KR)

( * ) Notice: Subject to any disclaimer, the term of this patent is extended or adjusted under 35 U.S.C. 154(b) by 669 days.

(21) Appl. No.: 12/577,937

(22) Filed: Oct. 13, 2009

(65) Prior Publication Data

US 2010/0284405 A1 Nov. 11, 2010

(30) Foreign Application Priority Data

May 7, 2009 (KR) .................. 10-2009-0039643

(51) Int. Cl.
*H04L 12/56* (2006.01)

(52) U.S. Cl. .............. 370/392; 370/395.32; 709/230; 709/231; 709/232; 709/247; 709/203

(58) Field of Classification Search .............. None
See application file for complete search history.

(56) References Cited

U.S. PATENT DOCUMENTS

| 8,018,940 B2 * | 9/2011 | Hao et al. .............. 370/392 |
| 2010/0269024 A1 * | 10/2010 | Hao et al. .............. 714/777 |
| 2011/0128959 A1 * | 6/2011 | Bando et al. .............. 370/392 |

* cited by examiner

*Primary Examiner* — Bunjob Jaroenchonwanit
(74) *Attorney, Agent, or Firm* — Harness, Dickey & Pierce, P.L.C.

(57) ABSTRACT

The present disclosure provides IP address lookup method and apparatus. In one embodiment of the disclosure, an IP address lookup apparatus stores node information generated for a binary search-on-levels architecture in a universal multi-hashing table prior to searching with an advance filtering by a universal Bloom filter minimizing the number of accesses to the universal multi-hashing table before executing the IP address lookup.

13 Claims, 16 Drawing Sheets

|  | PREFIX |
|---|---|
| P0 | 0011* |
| P1 | 01* |
| P2 | 1* |
| P3 | 100* |
| P4 | 11* |
| P5 | 1110* |
| P6 | 11100* |

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | 1 | 1 | 0 | 0 | 1 | 1 | 1 | 1 | 0 | 1  | 0  | 0  | 1  | 0  | 1  |

*FIG. 8*

```
Search(input)
{
   do {
      in = Cut_input(input, L);
      code = CRC(in, 128);
      ind1 = first ⌈ log₂N ⌉ bits of code;
      ind2 = last  ⌈ log₂N ⌉ bits of code;
      if( (All length Bloom Filter(ind1)==1)
          && (All length Bloom Filter(ind2)==1) ) {
         if((All length Multi-hashing Tbl1(ind1)==in)
          || (All length Multi-hashing Tbl2(ind2)==in) ){
            BMP=in;
            if(L is final access level) return;
            else L=next access level of the long length;
         }
         else L=next access level of the short length;
      }
      else L=next access level of the short length;
   }while (L != final access level);
}
```

*FIG.10*

METHOD AND APPARATUS FOR SEARCHING IP ADDRESS

CROSS-REFERENCE TO RELATED APPLICATIONS

This application claims the benefit and priority of Korean Patent Application No. 2009-0039643, filed May 7, 2009. The entire disclosure of the above application is incorporated herein by reference.

TECHNICAL FIELD

The present disclosure relates to a method and apparatus for searching IP addresses. More particularly, the present invention relates to a method and apparatus for enabling effective searching of IP addresses by reducing the memory demand and the number of accesses to the memory.

BACKGROUND OF THE DISCLOSURE

The Internet communication has experienced an exponential speed boost, and it is very important to forward packets in wire-speed of the packets coming into routers. In response, many algorithms have been developed to enhance the router performance, which may be evaluated by certain measures. A first performance measure being used is the number of memory accesses required at the time of the address lookup to a routing table stored in the router. To speed up the packet forwarding, searching for forwarding information with fewer memory accesses is desirable. A second measure is the size of the memorized routing table in the router. The table is desirably constructed to store as many prefixes as possible effectively in the limited router memory. This depends upon the data structure of the IP address lookup algorithm. A third measure is the readiness of data updates by adding or deleting prefix information of the networks connecting the router. Actually, a huge number of prefixes per second are being renewed and deleted. So, it is important to accommodate such information in real time to go through an accurate searching. A fourth measure is the extensibility of the addressing scheme from the Internet Protocol version 4 (IPv4) to version 6 (IPv6). The current popular IPv4 address family has been exhausted and the transition became necessary to the almost infinite Internet addresses available through IPv6. Thus, it is a must to accommodate this change.

In the past, address lookup has been performed according to "Exact Matching" procedures by using the address family with classes. A classless inter-domain routing (CIDR), however, is currently under popular use to prevent the prefixes from being wasted. The CIDR allows the construction of variously sized networks depending on the number of hosts connected to the networks. On the flip side, the CIDR requires prefixes created in various lengths which make the procedures of the Internet address lookup very complex in switching systems such as routers. A prefix length is the network part of the destination address of an input packet. Not knowing the prefix length in advance, with respect to each input packet it is possible for the router to contain a number of matching prefixes of which the longest matching prefix (LMP) becomes the best matching prefix (BMP).

There have been efforts to find an effective IP address lookup architecture that satisfies the above described router performance measures and meets the address scheme change. Many researches on IP address lookup architectures have yielded tree architecture-based algorithms, hashing-based algorithms, and Bloom filter-based algorithms.

Among the conventional tree architecture-based algorithms, a binary trie (B-Trie) algorithm stores information in matching nodes by way of each bit value of the prefix. This algorithm starts searching from the most significant bit of the prefix as it checks through the respective bit values from the root of the tree. The binary trie algorithm is simple in architecture but has a disadvantage of having many empty nodes. This in turn has a huge memory demand and has a downside with respect to lookup speed because searching has to proceed linearly to the maximum length of the prefix in the worst case scenario to thereby critically deteriorate the searching performance.

In addition, among the conventional tree architecture-based algorithms, a binary search tree (BST) algorithm has less memory demand for its lack of empty nodes unlike the binary trie algorithm. This algorithm, however, needs a binary lookup tree to be structured reflecting nesting relations of the prefix and thus the structural unbalance will become worsen, depending on the degree of nesting causing deterioration in the search performance.

In addition, among the conventional hashing-based algorithms, a parallel hashing architecture algorithm has separate hashing hardware, main tables and sub-tables in each prefix length. According to the algorithm, every table is stored in the individual SRAMs making the search carried out by allowing parallel access to each table. In this algorithm, the longest table output goes through as the final search result in a priority encoder.

Such a parallel hashing architecture algorithm allows parallel access to each table and in turn provides a fast search only at the cost of more hardware and memory resources. Moreover, hardware structuring is supposed to be specified for each routing group, making its software equivalence can not be readily achieved with necessary flexibility.

Lastly, a conventional Bloom filter-based algorithm constructs Bloom filters by prefix length for filtering an input value by using a bit-vector by checking whether it is an element of a specified set. The thus reduced number of accesses to the hash table through the Bloom filter improves the search performance. The prefix length-specific construction of the Bloom filters, however, causes a highly complex architecture.

To summarize, various prior art IP address lookup architectures have failed to either satisfy such requirements as the router performance measures or to provide a handsome to meet the changing need in the transition of the address lookup schemes.

DISCLOSURE OF THE INVENTION

In view of the above, one embodiment of the present disclosure provides an IP address lookup with no need to implement the prefix length-specific constructions of the Bloom filters and hash tables and instead utilize a single all-length or universal Bloom filter and a universal multi-hashing table, whereby substantially reducing the memory demand to make the IP lookup efficient and faster.

Another embodiment of the disclosure utilizes a universal Bloom filter to limit the access to a universal multi-hashing table as needed, thereby substantially reducing the number of access and eventually providing more efficient and faster IP address lookup procedure.

Yet another embodiment of the present disclosure provides a fast IP address lookup with the improved efficiency and speed also in the IPv6 address scheme having a greater number of bits than IPv4 scheme through the universal Bloom filter and the universal multi-hashing table which substantially reduces the memory demand and the memory accessing events.

One embodiment of the present disclosure provides an IP address lookup apparatus comprising: a bit extractor, having IP addresses inputted and stored therein, for extracting bits from the stored IP address depending on an access length directed by a control signal upon each receipt of the control signal; a hashing section for hashing the extracted bits to generate multiple hashing indices; a universal Bloom filter lookup section for searching in a universal Bloom filter to look for a bit-vector value indexed by each of the multiple hashing indices; a universal multi-hashing table lookup section, depending on the search result of the universal Bloom filter lookup section, to search for node information indexed by each of the multiple hashing indices in a universal multi-hashing table; a best matching prefix updater for updating a best matching prefix based on an existing node information if there exists a searched node information that matches the extracted bits; an output generator for generating an updated best matching prefix as an output value if an access level corresponding to an access length is the last one of multiple levels; and an access level controller for selecting one of the multiple levels as an access level and outputting the control signal directing an access length corresponding to the selected access level to the bit extractor based on the search result from the universal Bloom filter lookup section or the universal multi-hashing table lookup section and in a predefined sequence of the levels, if the access level is not the last level.

Another aspect of the present disclosure provides an IP address lookup method comprising: extracting bits from stored IP addresses depending on an access length directed by the control signal upon each receipt of a control signal while having the IP addresses inputted and stored; hashing the extracted bits to generate multiple hashing indices; searching a universal Bloom filter for a bit-vector value indexed by each of the multiple hashing indices; searching for node information indexed by each of the multiple hashing indices depending on the search result of the universal Bloom filter searching; updating a best matching prefix based on the existing node information if a node information matching the extracted bits exists among the searched node information; generating an updated best matching prefix as an output value, if an access level corresponding to the access length is the last level; and selecting one of the multiple levels as an access level and outputting the control signal directing an access length corresponding to the selected access level, based on the search result from the universal Bloom filter searching or the universal multi-hashing table searching and in a predefined sequence of the levels, if the access level is not the last level.

As described above, according to an embodiment of the present disclosure, rather than involving Bloom filters and hash tables to implement in each prefix length, the single universal Bloom filter and the single universal multi-hashing table are utilized to substantially reduce the memory demand enabling an efficient IP address lookup.

Also, according to an embodiment of the present disclosure, using the universal Bloom filter an access to the universal multi-hashing table may be restricted as needed, thereby substantially reducing the access numbers to the memory enabling a more efficient and faster IP address lookup.

Further, according to an embodiment of the present disclosure, using the universal Bloom filter and the universal multi-hashing table substantially reduces both the memory demand and access number enabling a more efficient and faster IP address lookup in IPv6 address scheme where more bit numbers are involved than the IPv4 scheme.

BRIEF DESCRIPTION OF THE DRAWINGS

The above and other objects, features and advantages of the present disclosure will be more apparent from the following detailed description taken in conjunction with the accompanying drawings, in which:

FIG. 5 is a view for illustrating a prefix set;

FIG. 8 is a view for illustrating a universal Bloom filter;

FIG. 10 is a view for illustrating pseudo-code for the binary searching on levels according to an embodiment of the present disclosure;

DETAILED DESCRIPTION OF THE EXEMPLARY EMBODIMENTS

Figure 1:
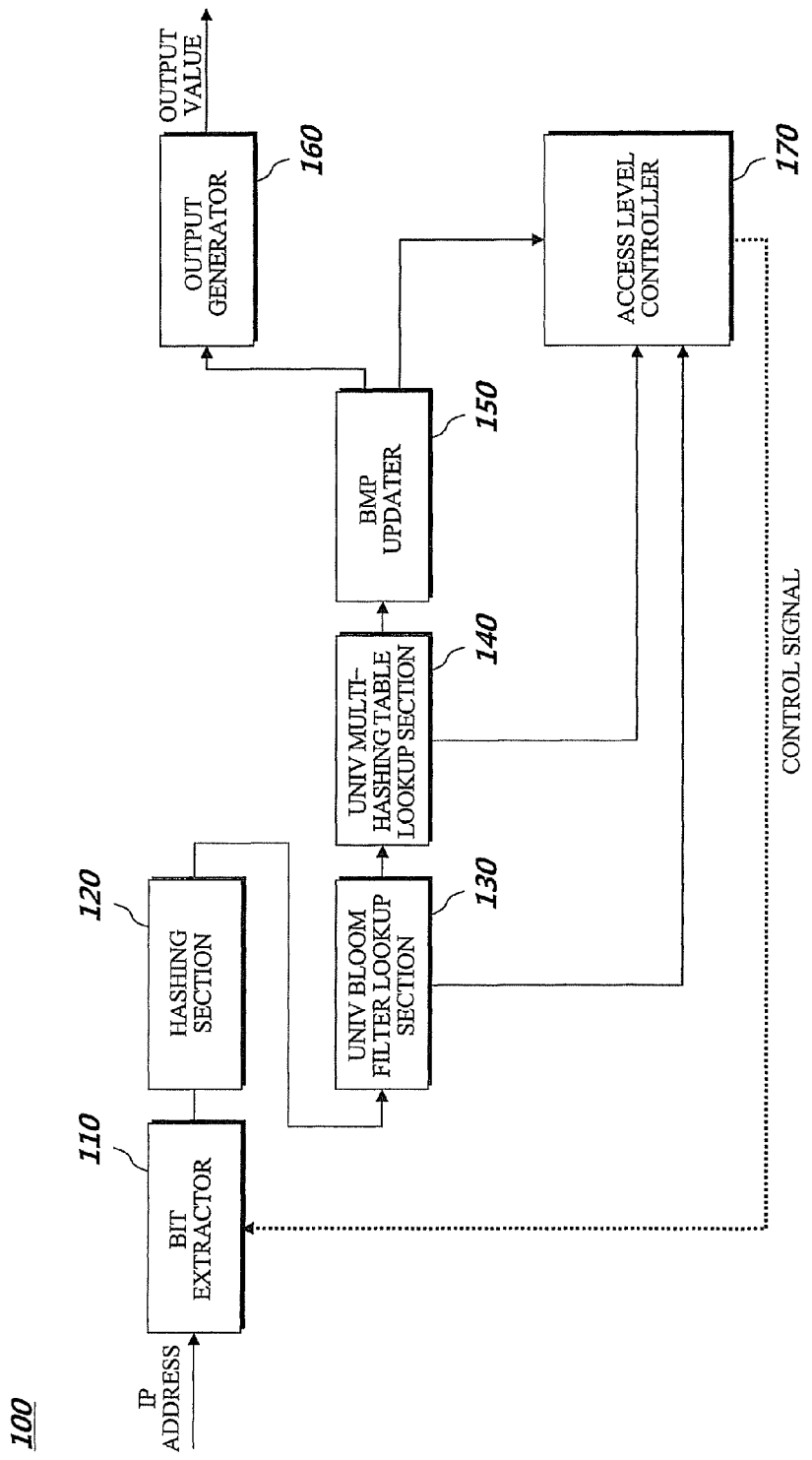
FIG. 1 is a block diagram of an IP address lookup apparatus according to an embodiment of the present disclosure.

Hereinafter, an exemplary embodiment of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is a block diagram of an IP address lookup apparatus 100 according to an embodiment of the present disclosure.

Referring to FIG. 1, the present IP address lookup apparatus 100 may comprise a bit extractor 110, a hashing section 120, a universal Bloom filter lookup section 130, a universal multi-hashing table lookup section 140, a best matching prefix (BMP) updater 150, an output generator 160, and an access level controller 170.

The bit extractor 110 has IP addresses inputted and stored therein and upon receipt of respective control signals, extracts bits from the stored IP address depending on an access length directed by the control signal. The hashing section 120 hashes the extracted bits in the bit extractor 110 to generate multiple hashing indices. The universal Bloom filter lookup section 130 searches for bit-vector values indexed by each of the multiple hashing indices in a Bloom filter. Depending on the search result of the universal Bloom filter lookup section 130, the universal multi-hashing table lookup section 140 searches for node information indexed by each of the multiple hashing indices on a universal multi-hashing table. Among the searched node information by the multi-hashing table lookup section 140, if the node information exists matching the bits extracted by the bit extractor 110, the BMP (best matching prefix) updater 150 updates a best matching prefix based on the existing node information. The output generator 160 generates the updated BMP as the output value if the access level (i.e. access level at the time of the BMP renewal) corresponding to the current access length is the last level. If the access level is not the last level, based on the search result from the universal Bloom filter lookup section or the universal multi-hashing table lookup section and in a predefined sequence of levels, the access level controller 170 determines one of the levels as an access level and outputs the control signal directing an access length corresponding to the determined access level to the bit extractor 110.

The recited bit extractor 110 may receive either 32-bit version 4 of IP addresses, i.e. IPv4 addresses or 128-bit version 6 of addresses, i.e. IPv6 addresses.

Figure 2:
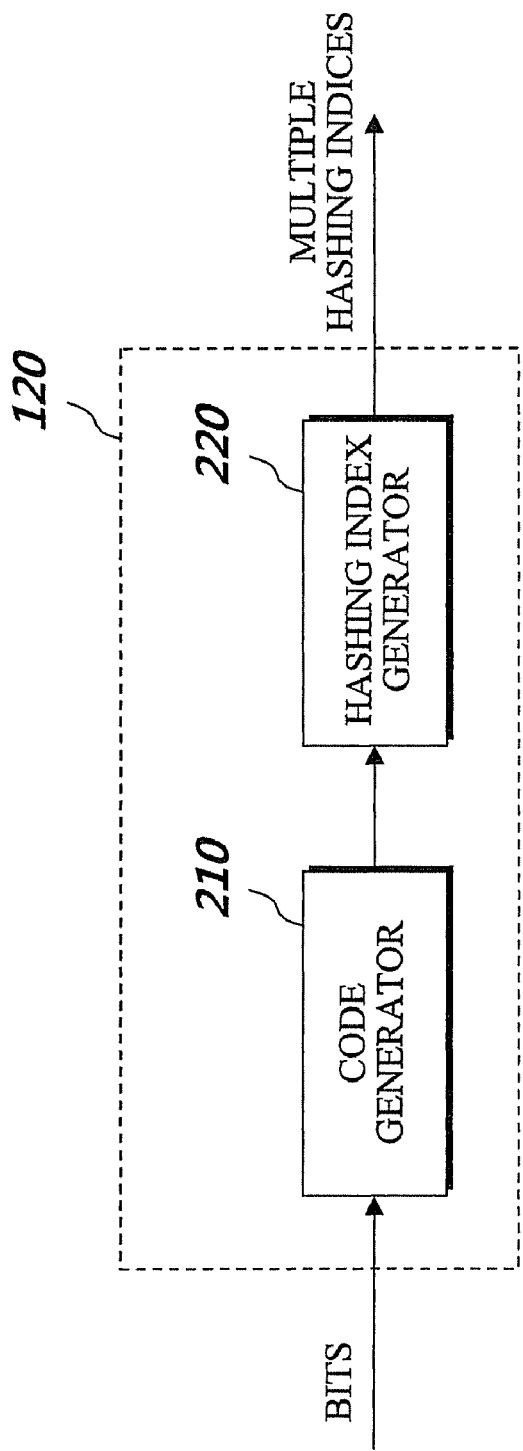
FIG. 2 is a block diagram of a hashing section in an IP address lookup apparatus according to an embodiment of the present disclosure.

As shown in FIG. 2, the hashing section 120 may comprise a code generator 210 for generating a predetermined length of codes from the extracted bits of the bit extractor 110, and a hashing index generator 220 for generating multitude of hashing indices from the generated codes of the code generator 210.

In the code generator 210, various lengths of prefixes may have their respective bits mixed under a certain rule to generate scrambled codes of a common length from which the hashing index generator 220 selects what correspond to user's preferred number of bits in order to generate the multiple hashing indices. For example, the code generator 210 may be a cycle redundancy check (CRC) generator.

The universal Bloom filter lookup section 130 searches for the bit-vector values indexed by the respective multiple hashing indices generated in the hashing section 120. The searched bit-vector values are the information for determining whether the extracted bits from the bit extractor 110 are included in the entry of the universal multi-hashing table.

For example, if the extracted bits from the bit extractor 110 are included in the entry of the universal multi-hashing table, then in the course of programming for the universal Bloom filter the bit-vector values indexed by the hashing indices in the universal Bloom filter were set to "1" whereas if the extracted bits from the bit extractor 110 are not included in the entry of the universal multi-hashing table, then the bit-vector values indexed by the hashing indices in the universal Bloom filter were set to "0".

Conversely, when all the bit-vector values indexed by the multiple hashing indices are "1", it can be determined that the extracted bits from the bit extractor 110 are included in the entry of the universal multi-hashing table according to the above example of bit-vector values. In comparison, when at least one of the bit-vector values indexed by the multiple hashing indices is "0", the extracted bits from the bit extractor 110 may not be deemed included in the entry of the universal multi-hashing table.

This is how the bit-vector values searched by the universal Bloom filter lookup section 130 represent that the extracted bits from the bit extractor 110 are determined for their inclusion in or exclusion from the entry of the universal multi-hashing table to control their access to the universal multi-hashing table.

If, depending on the bit-vector values searched by the universal Bloom filter lookup section 130, the extracted bits from the bit extractor 110 are determined as not being included in the entry of the universal multi-hashing table, then the access of the multi-hashing table lookup section 140 to the universal multi-hashing table is inhibited and the access level controller 170 controls the level of accessing as it outputs a control signal, which will enter the bit extractor 170 permitting a search for the next level. This prevents unnecessary accesses of the universal multi-hashing table.

Only when the bit-vector values searched by the universal Bloom filter lookup section 130 represent that the extracted bits from the bit extractor 110 are determined as being included in the entry of the universal multi-hashing table, the universal multi-hashing table lookup section 140 is allowed to access the universal multi-hashing table for searching for the node information indexed by each of the multiple hashing indices.

The number of above described universal multi-hashing tables may be equal to that of the multiple hashing indices. For example, in the case where the hashing section 120 generated two hashing indices, there may be two of the universal multi-hashing tables.

In such a case, the universal multi-hashing table lookup section 140 may utilize the multiple hashing indices to search for the node information through parallelly accessing the respective universal multi-hashing tables. This node information search with parallel accessing to the universal multi-hashing tables will increase the search efficiency.

Among the searched node information by the multi-hashing table lookup section 140, if there exists node information that matches the extracted bits by the bit extractor 110 and the existing node information is the node information of the prefix nodes, then the BMP updater 150 saves the existing node information as the BMP, thereby updating the BMP.

As described above, thru utilizing the bit-vector values searched by the universal Bloom filter lookup section 130, if it is determined that the extracted bits from the bit extractor 110 are not included in the entry of the universal multi-hashing table, or if the searched node information by the multi-hashing table lookup section 140 has been determined matching with the extracted bit from the bit extractor 110 to update the BMP, then for the purpose of performing a search on the next level, the access level controller 170, in its due course determines the appropriately subsequent access level and outputs for directing the same to feed the bit extractor 110, thereby initiating the next level of lookup process.

Figure 3:
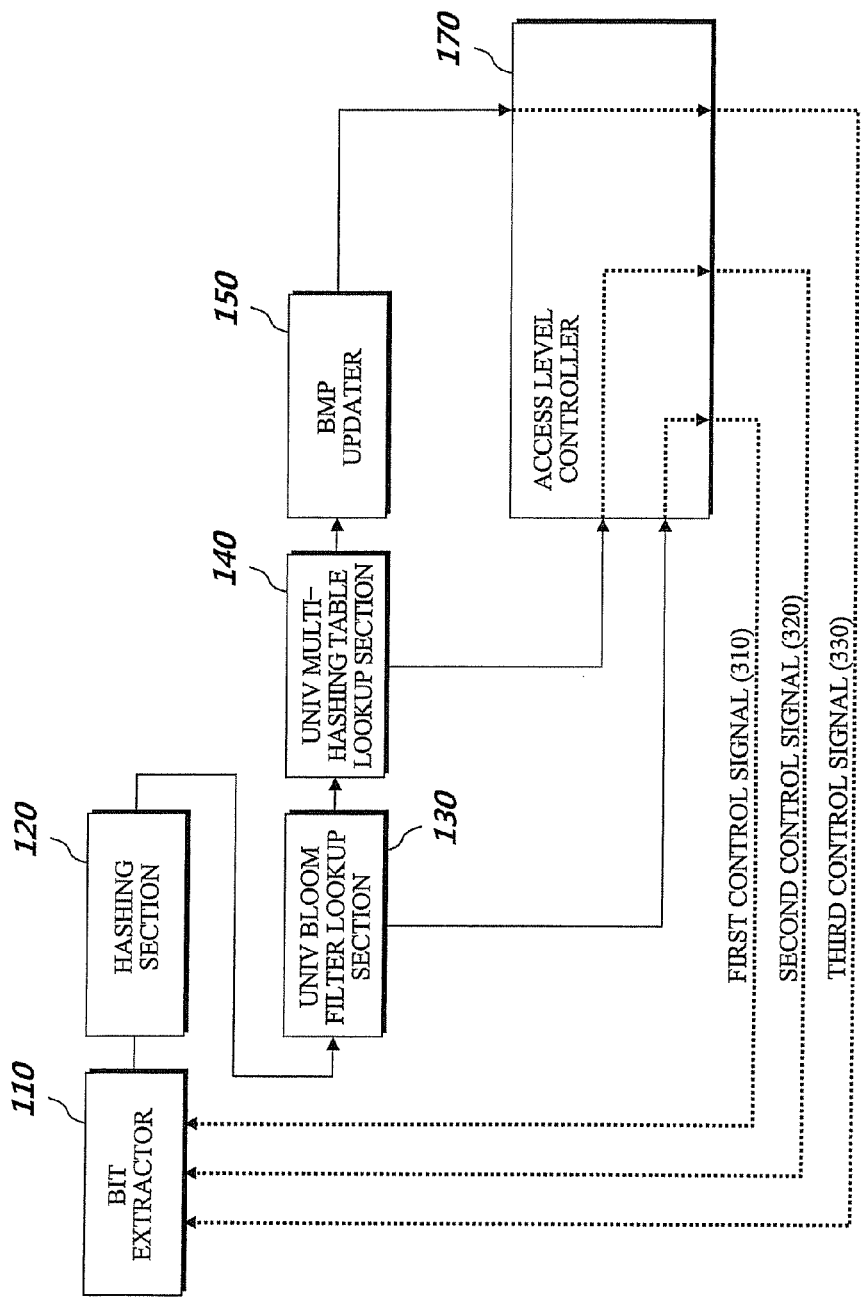
FIG. 3 is a view for illustrating an access level controller in an IP address lookup apparatus according to an embodiment of the present disclosure.

FIG. 3 illustrates that if the extracted bits from the bit extractor 110 are not found included in the entry of the universal multi-hashing table through the bit-vector values searched by the universal Bloom filter lookup section 130, the access level controller 170 selects among the multiple levels the subsequent shorter one as the access level based on a predefined sequence of the levels and outputs to the bit extractor 110 a first control signal 310 for directing the access length corresponding to the selected access level.

FIG. 3 also illustrates that if there is none of the searched node information by the universal multi-hashing table lookup section 140 matching the extracted bits by the bit extractor 110, the access level controller 170 selects among the multiple levels the subsequent shorter one as the access level based on a predefined sequence of the levels and outputs to the bit extractor 110 a second control signal 320 for directing the access length corresponding to the selected access level.

Additionally, if there exists any one of the searched node information by the universal multi-hashing table lookup section 140 matching the extracted bits by the bit extractor 110, the access level controller 170 selects among the multiple levels the subsequent longer one as the access level based on a predefined sequence of the levels and outputs to the bit extractor 110 a third control signal 330 for directing the access length corresponding to the selected access level.

Figure 4:
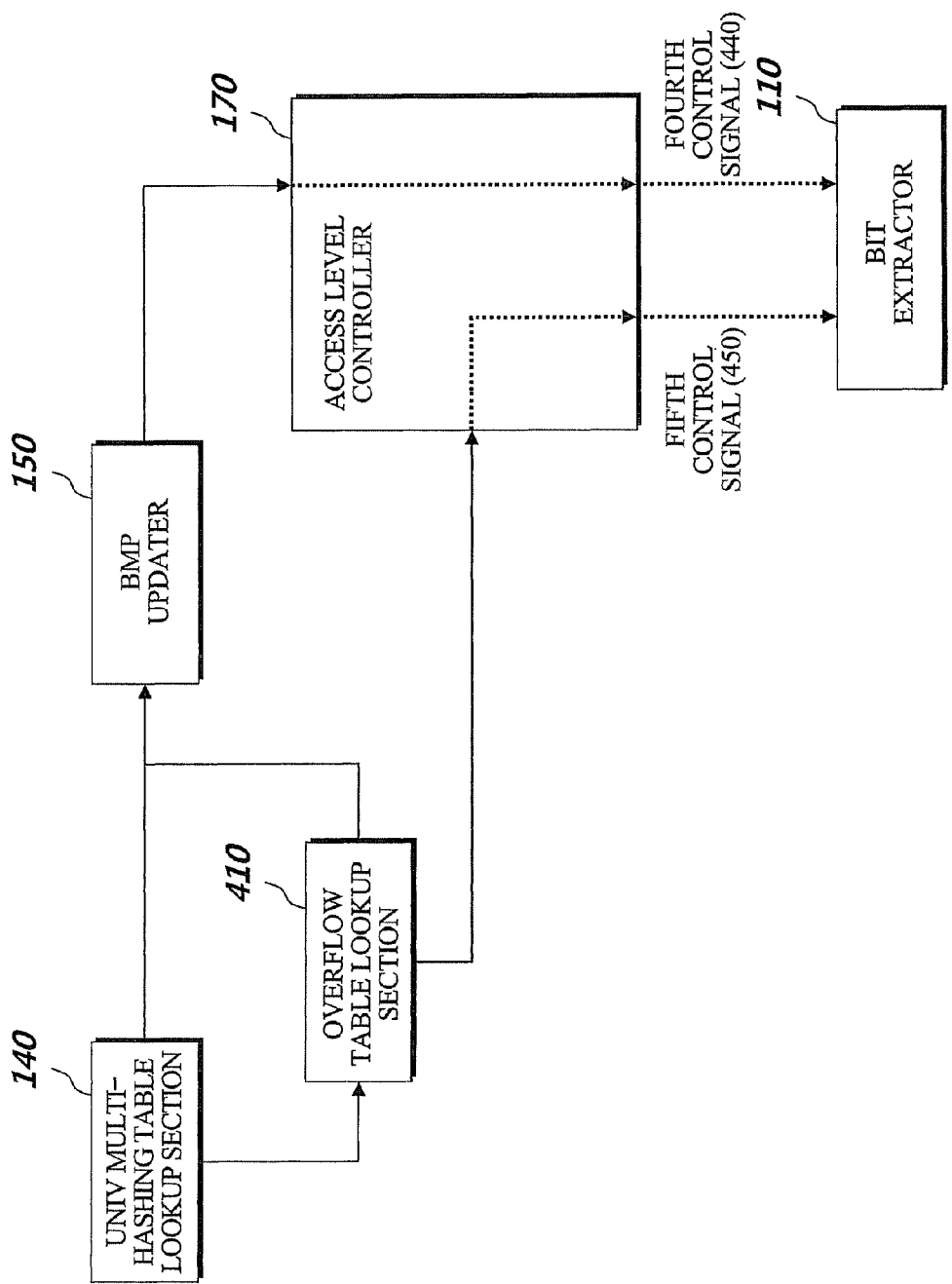
FIG. 4 is a view for illustrating an overflow table lookup section in an IP address lookup apparatus according to an embodiment of the present disclosure.

Referring to FIG. 4, the present IP address lookup apparatus 100 according to an embodiment of the present disclosure may further comprise an overflow table lookup section 410 to search for node information that matches extracted bits in an overflow table if there is none of the searched node information by the multi-hashing table lookup section 140 matching the extracted bits.

With the additional overflow table lookup section 410, the BMP updater 150 may update the BMP based on the searched node information by the overflow table lookup section 410.

In FIG. 4, if the node information searched in the overflow table matches the extracted bits by the bit extractor 110, the access level controller 170 selects among the multiple levels the subsequent longer one as the access level based on a predefined sequence of the levels and outputs to the bit extractor 110 a fourth control signal 440 for directing the access length corresponding to the selected access level.

Also in FIG. 4, if the node information that matches the bits extracted by the bit extractor 110 was not found on the overflow table, the access level controller 170 selects among the multiple levels the subsequent shorter one as the access level based on a predefined sequence of levels and outputs to the bit extractor 110 a fifth control signal 450 for directing the access length corresponding to the selected access level.

In the above, the present IP address lookup apparatus 100 has been generally described referring to FIGS. 1 to 4. Below is a more detailed description on the IP address lookup apparatus 100 through the ensuing drawings.

An embodiment of the present disclosure provides a binary search process which utilizes a prefix length as the level for application not only to the 32-bit IPv4 address but also expansively to the 128-bit IPv6 address lookup while enhancing the IP address lookup in efficiency over other prior art IP address lookup algorithms. An IP address lookup architecture of an embodiment of the present disclosure is adapted to store the node information generated for the binary search-on-levels architecture in the universal multi-hashing table while utilizing the universal Bloom filter to perform an advance filtering before an access to the universal multi-hashing table. This minimizes the access times to the universal multi-hashing table that can be in the form of an external memory to improve the search performance.

Described below is to illustrate among the entire processes performed by the present IP address lookup apparatus 100 (1) a hashing index generating, (2) a universal Bloom filter programming, (3) a prefix storing in the universal multi-hashing table, (4) a binary searching on levels, and (5) an updating with reference to the ensuing drawings.

To facilitate the explanation, a prefix group and its matching binary search-on-levels architecture are assumed as follows:

FIG. 5 assumes a prefix group having seven prefix nodes, which comprise P0, P1, P2, P3, P4, P5, and P6 each having a prefix as node information.

Figure 6:
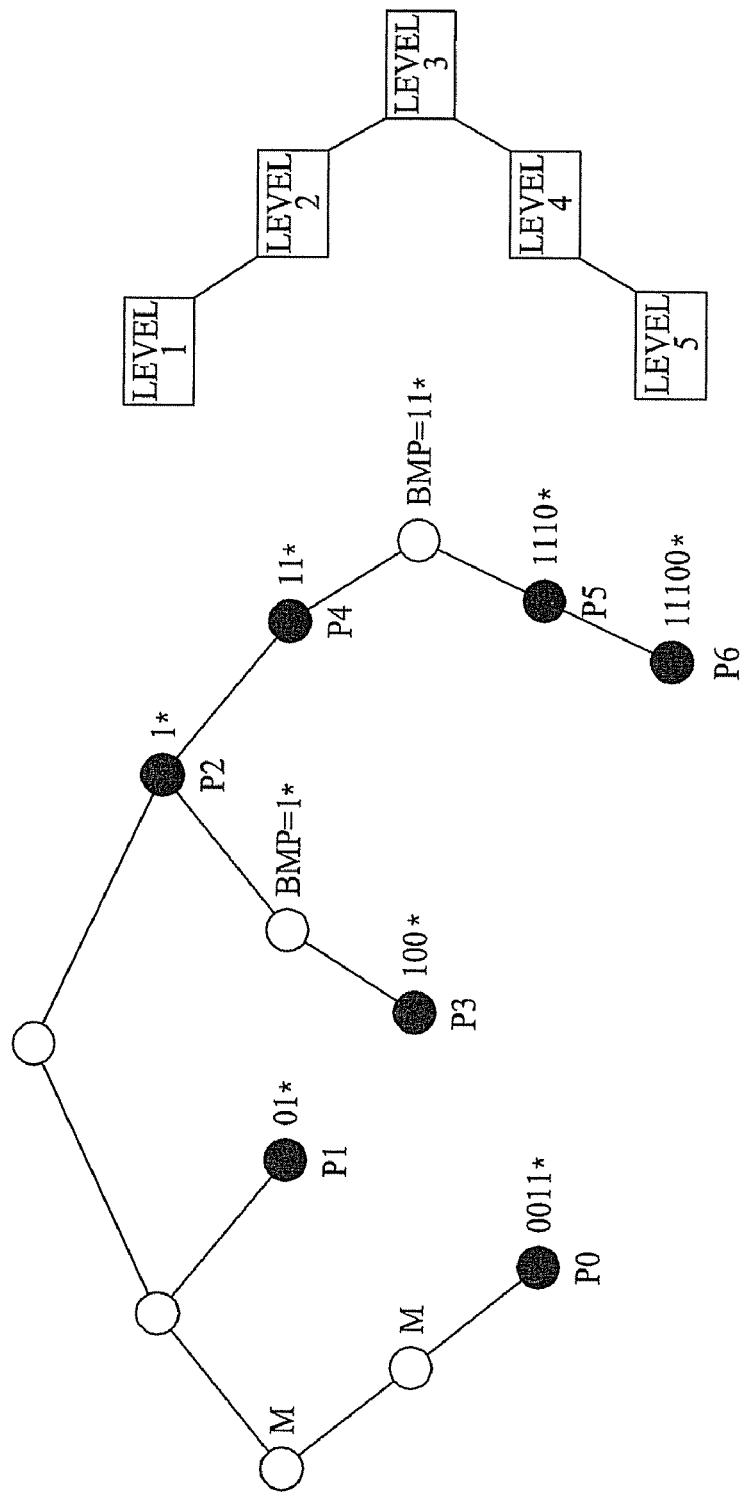
FIG. 6 is a view for illustrating a binary search-on-levels architecture.

Using the prefix group of FIG. 5, the binary search-on-levels architecture may be constituted as shown in FIG. 6. At the right side of FIG. 6, a sequence of access is indicated. In the middle is a level 3 accessed the earliest, followed by a level 2 or 4 accessed secondly, followed by a level 1 or 5 accessed the last.

Also, as in FIG. 6, markers M or BMPs may be stored in the respective empty nodes, which are present in other levels than the finally accessed ones (in FIG. 5, levels 1 and 5) at the time of the binary search process. Storing the marker M may be such that when the subject empty node holds no prefix stored but a subsequent node of a greater length has a prefix, its indicative marker is allowed to be stored in the subject empty node while storing the BMP may be performed by precalculating the BMP down to the subject empty nodes. Herein, an empty node storing the marker is called a marker node and other empty node storing the BMP is called a BMP node.

Hereinafter, the bit numbers recited for the example prefixes, certain lengths of codes, multiple hashing indices, etc. are illustrative purposes only and they may be varied in reality depending on the bit numbers of the received IP addresses by the IP address lookup apparatus 100, the prefix counts, the code generator 210, the number of hash functions, the number of hashing indices, or the IP address lookup performances.

(1) Hashing Index Generation

A hashing index may be generated by the hashing section 120 which includes the code generator 210 and the hashing index generator 220 for use as information in searching the universal Bloom filter and the universal multi-hashing table. In the following description, the code generator 210 is presumed as a cycle redundancy check (hereinafter referred to as CRC) generator, for example.

The CRC generator receives input values (i.e., the extracted bits by the bit extractor 110) of various lengths and under a certain rule blends the respective bits of the input values to generate scrambled values (i.e., codes) of a uniform length. With the use of this architecture, it becomes easy to blend the input values advantageously facilitating its implementation.

The CRC generator works well for the code generator 210 in this embodiment due to its ability to draw user's desired length of hashing indices from generating a uniform length of codes with the receipts of input values (i.e., the extracted bits by the bit extractor 110) of various lengths. It should be understood by those skilled in the art that any other types of code generators than the CRC generator will equally work well as long as they can generate the uniform-length codes from receiving various lengths of input values.

Figure 7:
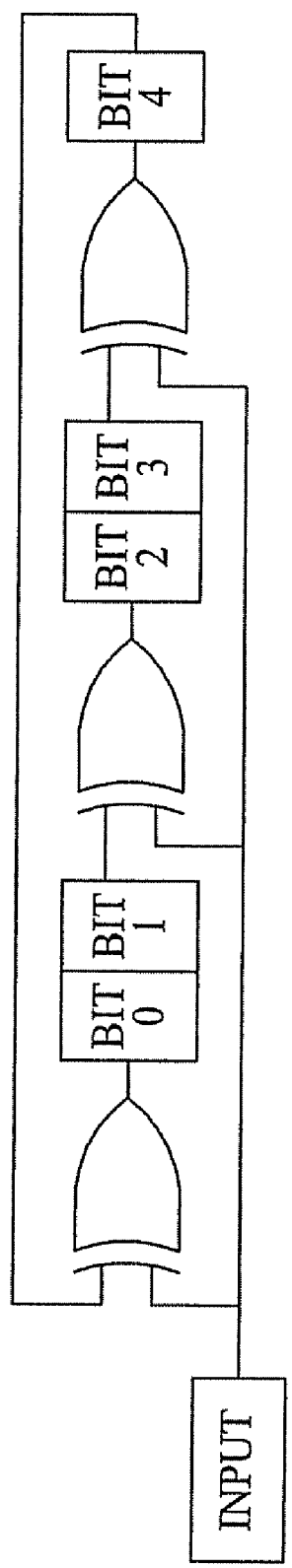
FIG. 7 is a view for illustrating a CRC generator as an example of code generator.

A collision defines undesirable designations of multiple prefixes to the same position of the universal multi-hashing table which should be avoided by discriminating the hashing indices before hashing to minimize such collisions for the hashing efficiency, and it is imperative to have evenly distributed output values with respect to input values. I.e., evenly distributed output values are desirable for various lengths of input values. The CRC generator is regarded among the hashing functions as performing the near perfect hashing. This CRC generator is illustrated in FIG. 7 where it is exemplified as a 5-bit CRC generator for generating a uniform 5-bit length of codes. It should be understood by those skilled in the art here that the 5-bit CRC generator is for the illustrative convenience only although arbitrary lengths of CRC generators may be used in reality. Specifically, if the IP address lookup apparatus 100 of an embodiment of the present disclosure were adapted to search for a 128-bit IPv6 address, 128/n of n-bits CRC generators may be used such as either a single 128-bit CRC generator or two of 64-bit CRC generators. Otherwise, a single 64-bit CRC generator may be used twice in repeat or n-bit CRC generator may be repeatedly used 128/n times.

Referring to FIG. 7, the process to obtain the hashing indices with the CRC generator will be described.

FIG. 7 shows that when various lengths of prefixes, i.e. the extracted bits by the bit extractor 110 enter a CRC generator 700, the respective bits are blended under a certain rule in order to generate the same length of scrambled values, i.e. a uniform length of codes. Among the thus generated values predetermined bit numbers are selected as the user desires for use as hashing indices. As FIG. 7 shows, the entire flip-flop is initialized to a certain value (e.g. zero) and various lengths of prefixes (the extracted bits by the bit extractor 110) are input bit by bit as it is XORed with the flip-flop value. At the last input of the bits, the CRC generator 700 stops operating and the stored values in the flip-flop become the codes generated by the code generator 700, which is represented by the code generator 210.

In order to store the binary search-on-levels architecture in hash architecture, the 5-bit CRC generator 700 is used on the basis of the longest five bits in the node information of FIG. 6. Running the prefix nodes (P), marker nodes (M), and the BMP precalculated node (BMP) values through the 5-bit CRC generator 700 produces codes (called CRC codes) as shown in a Table 1 below.

TABLE 1

| NODE TYPE | NODE VALUE | CRC CODE |
|---|---|---|
| M | 00* | 00000 |
| M | 001* | 10101 |
| P | 0011* | 01111 |
| P | 01* | 10101 |
| P | 1* | 10101 |
| BMP | 10* | 11010 |
| P | 100* | 01101 |
| P | 11* | 01111 |
| BMP | 111* | 00010 |
| P | 1110* | 00001 |
| P | 11100* | 10000 |

(2) Programming Universal Bloom Filter

Before storing the binary search-on-levels architecture in the hash architecture, the universal Bloom filter may be used for the sake of a more efficient search performance.

This universal Bloom filter is structured so as to filter input values by checking if they are members of a prefix set thru using a bit-vector, and a process of programming is necessary to construct the universal Bloom filter. The universal Bloom filter may be made of a single Bloom filter with various lengths of prefixes programmed together into it to provide a simple implementation and low memory demanding filter, which is advantageously opposite from the conventional Bloom filters that are high in complexity and heavy in memory consumption due to their separate preparations in the respective prefix lengths.

In programming such a universal Bloom filter, the filter size may be defined as M, the number elements i.e., prefixes to be stored in the filter as N, and the number of hashing functions to use as k. Here, the universal Bloom filter size M is an arbitrary integer which is equal to 2 to the power B, where B is the number of bits needed for the hashing index. For example, by an equation 1 below the filter size M is adjustable depending on the desired filtering performance. In addition, 2 is assumed for the number of hashing functions to use.

$$B = (\log_2 N)$$

Equation 1

$$M = N' = 2^B$$

where B is an arbitrary integral number of $\log_2 N$ (integer value), otherwise a smallest integer greater than or equal to $\log_2 N$ or a greatest integer smaller than or equal to $\log_2 N$. Such B may have an arbitrary length and the universal multi-hashing table may have different performances depending on the size of B.

For the purpose of programming to the universal Bloom filter comprising M bits in total, the hashing indices are defined with values of 1 to M respectively, and considering the number of the hashing functions k assumed earlier to be 2 the multiple indices may also comprise two hashing indices of a Hashing Index 1 and a Hashing Index 2 as below where the Hashing Index 1 is assumed to be the first B bit or bits of the CRC code and the Hashing Index 2 the last B bit or bits. In this way, in the node architecture of FIG. 6, two hashing indices for each node (Hashing Index 1 and Hashing Index 2) may be obtained as a table 2 below.

TABLE 2

| NODE VALUE | CRC CODE | HASHING INDEX 1 (DECIMAL VALUE) | HASHING INDEX 2 (DECIMAL VALUE) |
|---|---|---|---|
| 00* | 00000 | 0000(0) | 0000(0) |
| 001* | 10101 | 1010(10) | 0101(5) |
| 0011* | 01111 | 0111(7) | 1111(15) |
| 01* | 10101 | 1010(10) | 0101(5) |
| 1* | 10101 | 1010(10) | 0101(5) |
| 10* | 11010 | 1101(13) | 1010(10) |
| 100* | 01101 | 0110(6) | 1101(13) |
| 11* | 01111 | 0111(7) | 1111(15) |
| 111* | 00010 | 0001(1) | 0010(2) |
| 1110* | 00001 | 0000(0) | 0001(1) |
| 11100* | 10000 | 1000(8) | 0000(0) |

Referring to the above described universal Bloom filter size M and hashing indices, the process of programming the universal Bloom filter is as follows:

Since the number (N) of the nodes is twelve, the universal Bloom filter size M=N'=16. With the entire bit-vector values of the universal Bloom filter being initialized as 0, the following programming of BFAdd(x) is executed. To be specific, the bit-vector value of the universal Bloom filter against a hashing index obtained through k hashing functions for a certain input is made into 1. In this way, the entire node information of FIG. 6 may be programmed into the Bloom filter 800 size (M=N') resulting in the illustration of FIG. 8.

BFAdd (x)
1) for (l=1 to k)
2) Vector[hi(x)]←1

As a result of the universal Bloom filter programming, the bit-vector values stored individually for each hashing index becomes decisive information to tell whether the extracted bits by the bit extractor 110 is included in the entry of the universal multi-hashing table, and in the above description of the process of programming the universal Bloom filter the bit-vector value was so exemplified that in the case where the bits extracted by the bit extractor 110 are included in the entry of the universal multi-hashing table the bit-vector value indexed by its hashing index is programmed as 1 whereas it is programmed as 0 if the extracted bits are not included in the same entry.

(3) Process of Storing the Prefix in the Universal Multi-Hashing Table

An embodiment of the present disclosure offers such architecture that stores node information of length-based binary search architecture in the universal multi-hashing table to improve the search performance and excels in the sense of the memory demand.

Contrary to the conventional individual hashing table constructions by the node information length, the current type of universal multi-hashing table has the distinctive architecture of a single hashing table that stores various lengths of node information, and this universal multi-hashing table may be constructed so that the hashing table number (=number of hashing functions or hashing indices), the number of buckets per hashing table and the number of loads per bucket determine the demanded memory size and the number of the overflows.

Below, it is assumed that in a particular universal hashing table the prefix number is N, and when using two hashing functions there are two hashing tables of HashTable 1 and HashTable 2 each having the buckets in the number of $2^B$=N' (where B is the smallest integer greater than or equal to $\log_2 N$) and each bucket has two loads (entries). Also, the two loads of each bucket may be defined as Left and Right. The two hashing tables of HashTable 1 and HashTable 2 can be stored in a SRAM, respectively.

The process of storing prefixes in the universal hashing table can be described as follows:

The hashing index values on the above HashTable 2 become pointers that indicate the buckets of the universal multi-hashing table. I.e. the hashing indices 1 and 2 are used to access the two hashing tables of HashTable 1 and HashTable 2 simultaneously. Comparing the load numbers in the two accessed buckets, the prefix is stored in the bucket with smaller number of loads. In the case where there is same number of loads in the two buckets, the first hashing table of HashTable 1 is assumed to store the prefix. If the two buckets are full, an overflow table may store the prefix.

It is possible to adjust the number of overflows by using the appropriately sized universal multi-hashing table, to limit the number of prefixes overflowing, and to implement the overflow tables with a cache or a small-sized TCAM.

(4) Process of Binary Searching on Levels

With the above described universal Bloom filter programmed and the prefix stored in the universal multi-hashing table, the IP address of the input destination undergoes the searching process, thereby producing forwarding information of a best matching prefix (BMP) to output.

The IP address lookup apparatus 100 according to the embodiment of the present disclosure performs the binary search utilizing lengths and thus a binary search for an input value on trie levels in order to carry out the searching for the longest matching prefix (LMP) as the best matching prefix (BMP).

Figure 9:
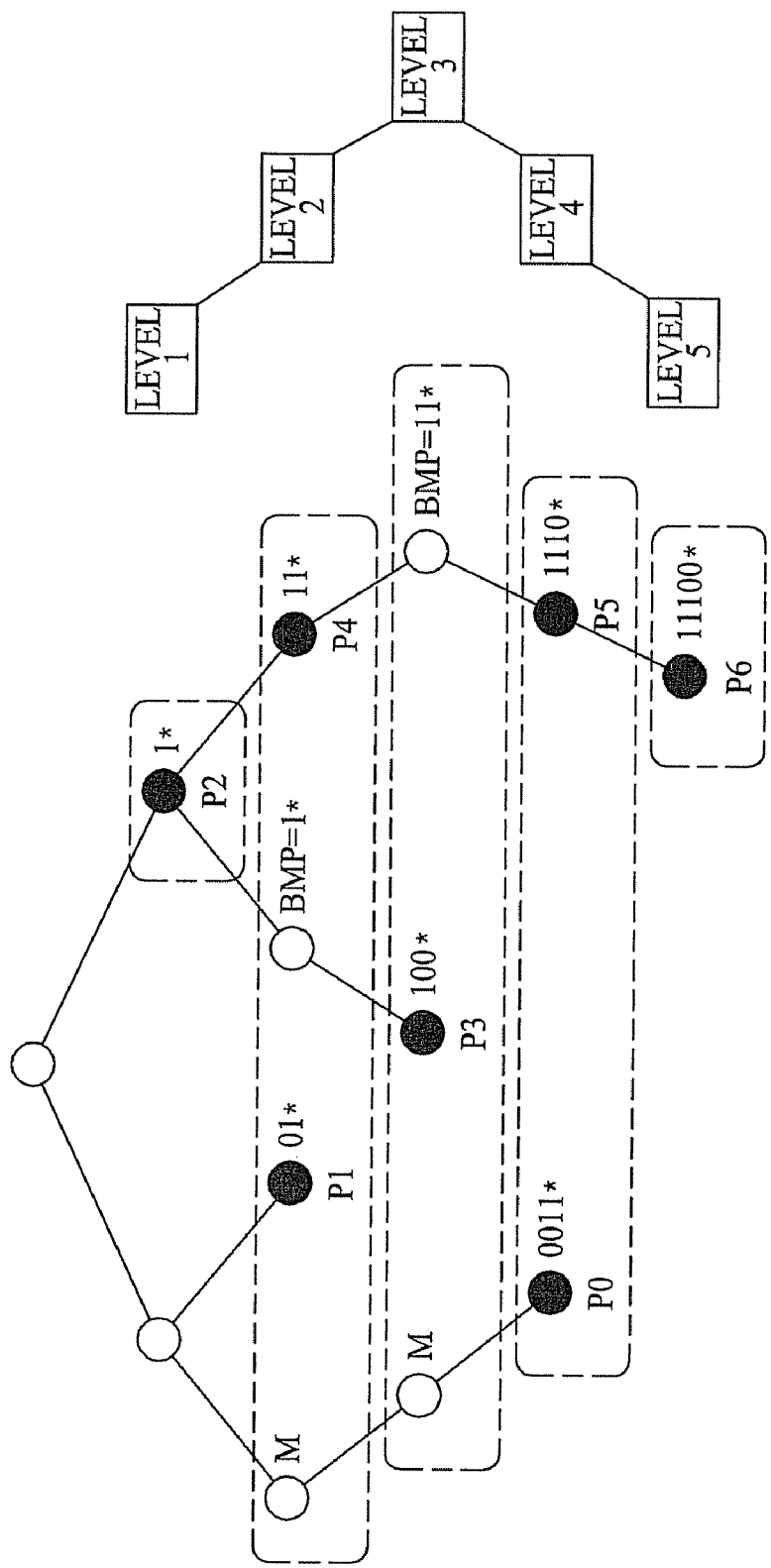
FIG. 9 is a view for illustrating binary searching nodes depending on the levels and the access levels.

FIG. 9 is a view for illustrating binary search-on-levels architecture. A trie shown in FIG. 9 represents the nodes that should be stored in a trie structure and a sequence of the access levels.

The CRC generator 700 incorporated in the hashing section 120 for acting as the code generator 210 and the universal Bloom filter that the Bloom filter lookup section 130 uses are assumed to be present inside a chip designed for the IP address lookup while the universal multi-hashing table that the universal multi-hashing table lookup section 140 uses is assumed to exist off chip. Then, using the universal Bloom filter may minimize the number of accessing the universal multi-hashing table that is in the form of an off chip memory. This is advantageous that even when prefix information of an IP address, especially a substantially long 128-bit IPv6 address, increases in volume steeply requiring a large memory space, the off-chip location of the memory to actually store the node information helps to easily accommodate the changing needs.

As shown in FIG. 9, the earliest access is made to the nodes on level 3, and if a matching node (marker node, prefix node or BMP node) is absent, the search proceeds to level 2 or else if there exists a matching node (marker node, prefix node or BMP node), the search proceeds to level 4. After proceeding the search to the last (level 1 or level 5) of the binary search on levels, the longest value of the matches (LMP) becomes BMP and its forwarding information is generated as the output value.

FIG. 10 is a view for illustrating pseudo-code for the binary search on levels. In the following, the binary search process (search(input)) on levels as shown in FIG. 10 will be described in correspondence with the respective components of FIG. 1.

Referring to FIG. 10, first, the bit extractor 110 extracts bits from the input (i.e. a number of bits of the input IP address, input) with the access length corresponding to the current access level L, and thereby extracts the bits (in) on the current access level L. This process is represented in the pseudo-code by ⌈in=Cut_input(input, L)⌉.

Thereafter, the CRC generator 210, an embodiment of the hashing index generator 220 in the hashing section 120, generates codes with a uniform length from the previously extracted bits (in). In the pseudo-code, this process is represented by ⌈code=CRC(in, 128)⌉.

Then, the hashing index generator 220 in the hashing section 120 extracts from the generated code the desired bits of two hashing indices (hashing index 1 or ind1 and hashing index 2 or ind2). In the pseudo-code, this process is represented by ⌈ind1=first [$\log_2 N$] bits of code⌉ and ⌈ind2=last [$\log_2 N$] bits of code⌉.

Then, the universal Bloom filter lookup section 130 uses the two generated hashing indices of hashing index 1 (ind1) and hashing index 2 (ind2) to proceed a querying whether the bits (in) from the bit extractor 110 are an element of the universal Bloom filter. For this purpose, in the universal Bloom filter, searching is performed for the bit-vector values indexed by the two hashing indices of hashing index 1 (ind1) and hashing index 2 (ind2), and through the searched bit-vector values it is determined whether the bits from the bit extractor 110 are included in the entry of the universal multi-hashing table. This process is represented by the first 'if' sentence in the pseudo-code.

For example, in the universal Bloom filter, if anyone of the bit-vector values indexed by the two hashing indices of hashing index 1 (ind1) and hashing index 2 (ind2) is 0 meaning the current access length has no matching nodes and thereby recognizing no further searching is necessary in the universal multi-hashing table, the access level controller 170 controls the access level and supplies the bit extractor 110 with the first control signal for directing an access length that corresponds to the controlled access level (L). This access level control in the access level controller 170 is represented by the 'else' line of the 'if' sentence in the pseudo-code.

If both of the bit-vector values indexed by the two hashing indices of hashing index 1 (ind1) and hashing index 2 (ind2) are 1 suggesting this access length of nodes may be present in the universal multi-hashing table, then the input, i.e. the bits (in) from the bit extractor 110 are allowed to pass the universal Bloom filter, and a search is performed on the possible existence of the same input in the universal multi-hashing table by utilizing the hashing index 1 (ind1) and hashing index 2 (ind2).

The universal multi-hashing table lookup section 140 performs searching in each of two hashing tables for a hashing table 1 (HashTable1) and a hashing table 2 (HashTable2) included in the universal multi-hashing table in order to determine whether node information stored in one of the two hashing tables (HashTable1 and HashTable2) matches with the bits (in) from the bit extractor 110. This process is represented by the second 'if' sentence in the pseudo-code. The two hashing tables of HashTable1 and HashTable2 may be stored in a separate SRAM in which searching may be processed by parallely accessing its memory.

With the value of the hashing index 1 (ind1) search is performed through the bucket of the hashing table 1 (HashTable1) and with the value of the hashing index 2 (ind2) through the bucket of the hashing table 2 (Table2) to check for the presence of a node matching the input (in) that is the bits extracted from the bit extractor 110. If the presence were checked, it becomes the latest BMP that needs a saving and then in preparation of proceeding the search toward the longer levels, the access level controller 170 controls the access level and supplies the bit extractor 110 with the third control signal for directing an access length that corresponds to the controlled access level (L). This access level control in the access level controller 170 is represented by the 'else' line of the third 'if' sentence within the second 'if' sentence of the pseudo-code in FIG. 10.

If no nodes are present during the search on the universal multi-hashing table (HashTable1, HashTable2), then the overflow table is searched for a possible matching event, which triggers the access level controller 170 to control the access level in preparation for the longer next levels, or in a no matching event suggesting the generation of a false positive, the search is directed toward shorter next levels by the access level controller 170 that controls the access level and supplies the bit extractor 110 with the second control signal for directing an access length that corresponds to the controlled access level (L). This access level control in the access level controller 170 is represented by the 'else' line of the second 'if' sentence of the pseudo-code in FIG. 10.

Example Binary Search on Levels

The above binary searching on levels described with reference to FIG. 10 will now be more specific in an example referring to FIGS. 9 and 11. Presently, the input IP address is assumed to be "00110" although it is for the convenience of explanation and may be either 32 bits (for IPv4) or 128 bits (for IPv6). In addition, the below referenced bits and bit numbers are for illustrative purposes only.

As shown in FIG. 9, the first level to access is LEVEL3, and because the access length to LEVEL3 is 3, the bit extractor 110 extracts the first three bits "001" from the input IP address "00110" to supply the same to CRC generator 700.

The CRC generator 700, an embodiment of the code generator 210 in the hashing section 120, generates from the 3-bit input "001" a code in a uniform 5-bit length, the generated code being 10101 referring to Table 1.

Hashing index generator 220 in the hashing section 120 generates a hashing index 1 using the first four bits of the previously generated 5-bit code and a hashing index 2 using the last four bits of the previously generated 5-bit code. The thus generated hashing indices 1 and 2 are respectively "1010" and "0101" or 10 and 5 in decimal numbers referring to Table 2.

The universal Bloom filter lookup section 130 utilizes the hashing indices 1(1010(10)) and 2(0101(5)) to execute the querying for the universal Bloom filter to search for the tenth and fifth bit-vector values of the universal Bloom filter. These searched tenth and fifth bit-vector values are both 1 referring to FIG. 8 which represents that the bit "001" extracted in the bit extractor 110 for LEVEL3 is included in the entry of the universal multi-hashing table. I.e., the probability is highly positive that the universal multi-hashing table may contain that node. In response, the universal multi-hashing table lookup section 140 utilizes the hashing indices 1(1010(10)) and 2(0101(5)) to perform searching in the universal multi-hashing table.

Figure 11:
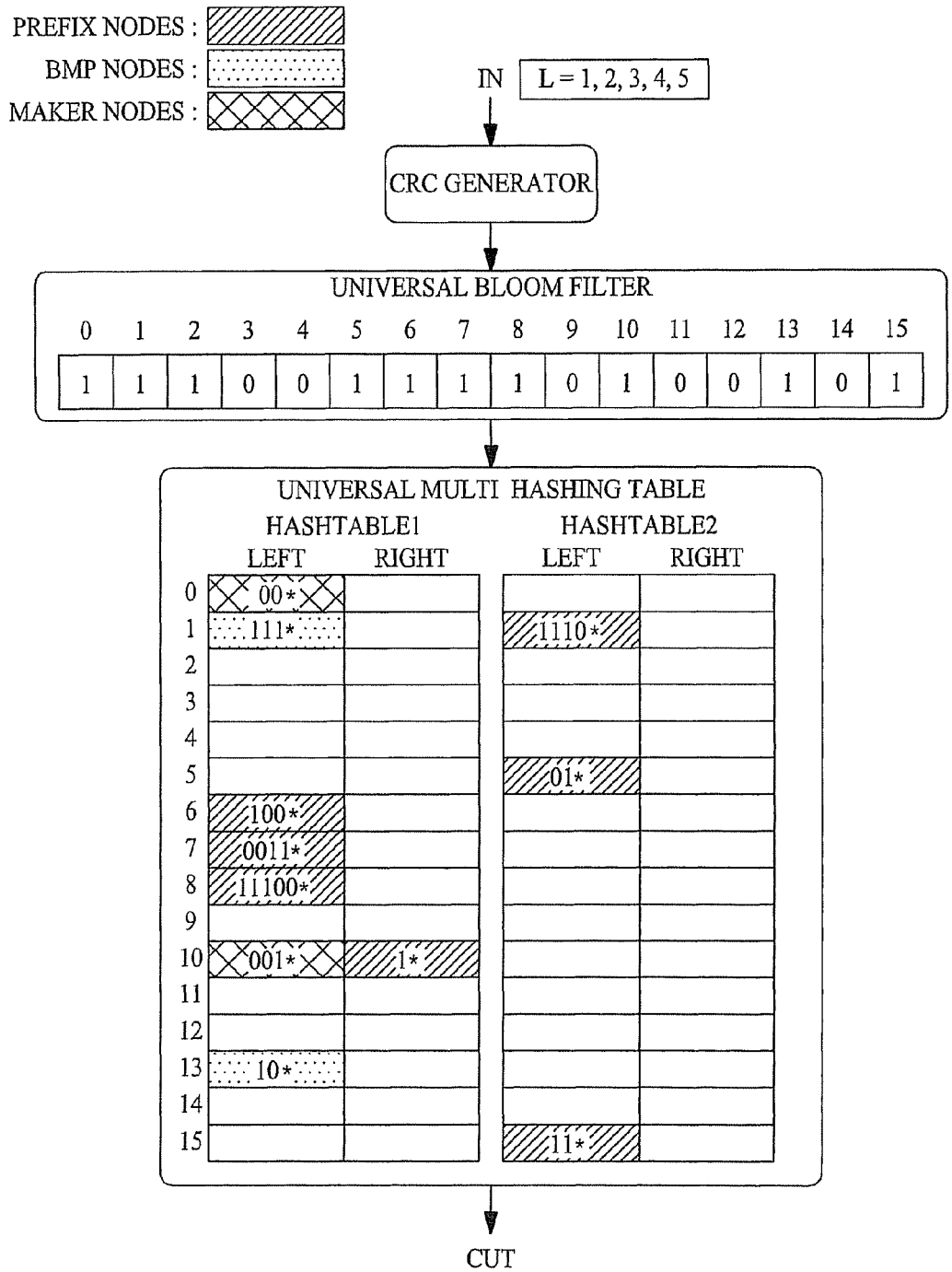
FIG. 11 is a view for illustrating exemplified binary searching on levels according to an embodiment of the present disclosure.

Referring to FIG. 11, after the universal multi-hashing table lookup section 140 performed searching with the hashing indices 1(1010(10)) and 2(0101(5)) through the two hashing tables of hashing table 1 (HashTable1) and the hashing table 2 (HashTable2) included in the universal multi-hashing table, it can be seen that there is node information present matching the input value, i.e. the bits "001" extracted in the bit extractor 110 for LEVEL3 at the left entry of the bucket of hashing table 1 indexed by the hashing index 1. As illustrated in FIG. 9, the node 001* in existence is a marker node (M) that has no stored prefix but tells the presence of a prefix node at the location of a longer node and thus continues the search process towards the longer next level. To be specific, since the current access level is LEVEL3, based on a predefined sequence of levels, the longer next level of LEVEL4 is determined to continue the search from. At the same time, the access level controller 170 outputs control information (i.e. third control signal) for directing the access length of 4 for the access level corresponding to LEVEL4 and feeds the same to the bit extractor 110 allowing the search to continue for the longer next level of LEVEL4.

Because the second access level of LEVEL4 is equivalent to the access length of 4, the bit extractor 110 extracts the first four bits "0011" from the input IP address "00110" that is stored and feeds the same to the CRC generator 700.

Thereafter, referring to Table 1, the CRC generator 700 generates from an input bit "0011" a code "01111" with a uniform length of five bits, and also two hashing indices from a 5-bit code "01111" generated by the CRC generator 700 referring to Table 2. These two generated hashing indices may comprise a first hashing index of "0111(7)" and a second hashing index of "1111(15)".

Then, the universal Bloom filter lookup section 130 performs searching for the bit-vector values indexed by the first hashing index of "0111(7)" and the second hashing index of "1111(15)" in the universal Bloom filter shown in FIG. 2 with the searched bit-vector values being 1, which represents that the bits "0011" extracted in the bit extractor 110 for LEVEL4 are included in the entry of the universal multi-hashing table. This means a highly positive existence of this node in the universal multi-hashing table. Therefore, universal multi-hashing table lookup section 140 proceeds searching in the universal multi-hashing table with the use of the first hashing index of "0111(7)" and the second hashing index of "1111 (15)".

Then, the universal multi-hashing table lookup section 140 performs searching in a seventh bucket of the hashing table 1 (HashTable1) and a fifteenth bucket of hashing table 2 (HashTable2) included in the universal multi-hashing table. Referring to FIG. 11, as a result of the search there is the node (0011*) present at the left entry of the bucket of the hashing table 1 (HashTable1), and since the node is a prefix node with the prefix stored in it, the BMP updater 150 updates (0011*) for BMP. And, due to this matching node in existence and because the output generator 160 judges the current LEVEL4 is not the last level, the access level controller 170 controls the access level to resume searching by outputting control information (i.e. the third control signal) to direct the access length of 5 for the access level corresponding to LEVEL5 and supplies the same to the bit extractor 110, thereby the search resumes for the longer next level of LEVEL5.

Because the third access level of LEVEL5 is equivalent to the access length of 5, the bit extractor 110 extracts the 5 bits "00110" from the input IP address "00110" that is stored, and the CRC generator 130 is fed with the extracted "00110" to generate the code of "10111". Thereafter, the hashing index generator 220 generates the hashing index 1 of "1011(11)" and the hashing index 2 of "0111(7)" from the generated code of "10111".

Then, the universal Bloom filter lookup section 130 performs searching for an eleventh bit-vector value and a seventh bit-vector value in the universal Bloom filter shown in FIG. 2, and since the eleventh bit-vector value is "0", it is blocked from passing the universal Bloom filter and no search is performed at the universal multi-hashing table. In addition, because the current access level of LEVEL5 is the last access level meaning the length of 5 is the last access length, the search is terminated and the output generator 160 generates the latest updated BMP of "0011*" saved as an output.

The IP address lookup apparatus 100 according to the present disclosure may complete any searches in two accesses to the universal multi-hashing table thanks to the universal Bloom filter for filtering out irrelevant values which would otherwise require three times of access to the universal multi-hashing table. In other word, the incorporation of the universal Bloom filter into the IP address lookup apparatus 100 prevents unnecessary accesses to the universal multi-hashing table from happening to provide an efficient address lookup.

(5) Process of Updating

An embodiment of the present disclosure, the process of adding new node information or deleting existing node information will now be described.

New node information to add is fed into CRC hardware (CRC generator) to obtain a code, from which two hashing indices are obtained. With the obtained two hashing indices, the universal Bloom filter is programmed, and accessing the universal multi-hashing table it is confirmed that the loads are at their places in the two hashing indices before inserting node information to the bucket with less loads. If the loads of the universal multi-hashing table are all filled up, node information is stored in the overflow table.

For the deletion of node information, a code that is the output value of the CRC generator of the information to delete is first obtained and then two hashing indices are obtained therefrom. With these two hashing indices, a search is performed in the universal multi-hashing table for table buckets indexed by the two hashing indices, and when the node information to delete is found, it is deleted. In the case of deletion, no deletion is made in the universal Bloom filter different from the addition process. Thus, in the process of binary search on levels false positives of the universal Bloom filter may increase due to undeleted node information though the search on the universal multi-hashing table will be accurately accomplished.

If there were too many repetitions of insertion and deletion of node information at the universal Bloom filter, the rate of the false positives of the filter may go up very high. For such a frequently updating router, it is possible to introduce a counting Bloom filter which counts the universal Bloom filter's components corresponding to its respective bit-vectors to save the count data in an extra space thereof. Then, at an insertion of information in the universal Bloom filter the count data of the matching bit-vectors may be increased by one while it is decreased by one upon deletion of the information. If the count were zero, the bit-vector value, 1 of the universal Bloom filter may be set to 0 so as to prevent the increase of the frequency of the false positives.

Further, an embodiment of the disclosed IP address architecture is free of a direct relationship with prefix lengths. Constructing the proposed algorithms with prefixes of either the 32-bit in IPv4 or 128-bit in IPv6 has no significant difference to consider. But, since it is influenced by the entry number of the prefix group, it is necessary to employ a universal multi-hashing table having the number of buckets corresponding to $2^B$ (where B may be an arbitrary integer or the smallest integer greater than or equal to $\log_2 N$ or a greatest integer smaller than or equal to $\log_2 N$ for the prefix number N).

At the event of an update increasing the entry number of the prefix group, the update is basically stored in the main table through hashing, and when a collision happens it is stored in an overflow table. In the worst case where there are too many prefixes to store in the overflow table increasing the cost too high, $2^B$ with B enlarged must be considered for application in reconstructing the universal multi-hashing table.

The above explains the IP address lookup apparatus 100 according to an embodiment of the present disclosure in a way to illustrate its efficient IP address searchability.

The below is the process that the IP address lookup apparatus 100 will follow referring to the flow chart of FIG. 12.

Figure 12:
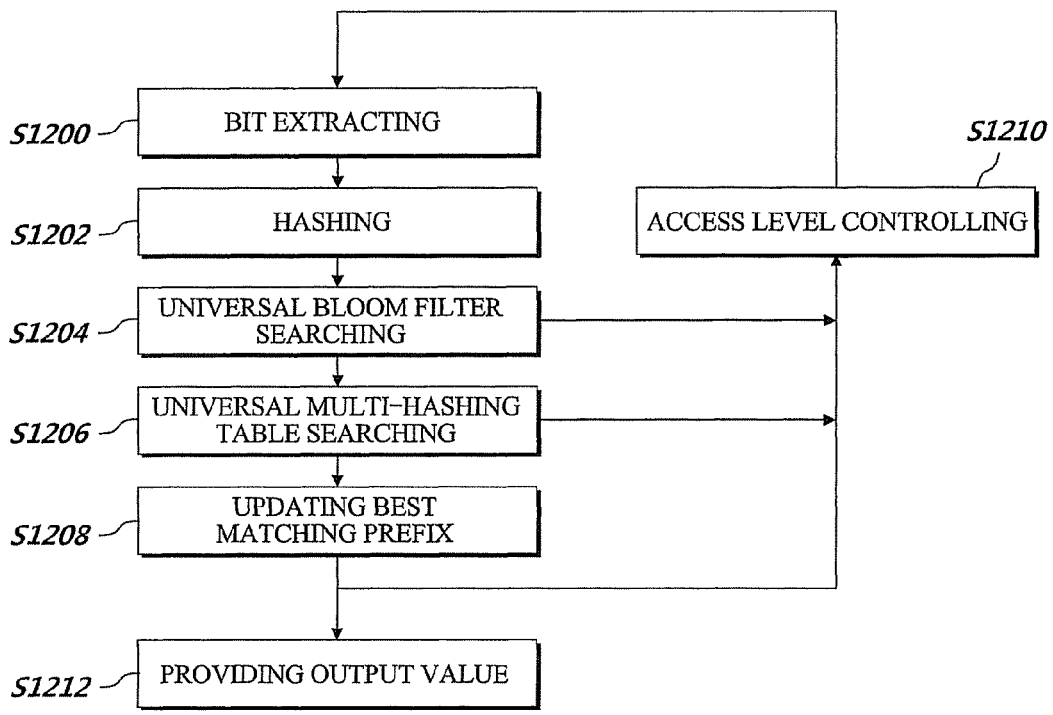
FIG. 12 is a flow chart of an IP address lookup process according to an embodiment of the present disclosure.

In FIG. 12, the disclosed embodiment of an IP address lookup method comprises the steps of bit extracting (S1200), hashing (S1202), universal Bloom filter searching (S1204), universal multi-hashing table searching (1206), updating best matching prefix (S1208), access level controlling (S1210), and providing output value (S1212).

The bit extracting (S1200) is to receive and store IP addresses and then extracts bits from the addresses depending on the access length as directed by the occasional control signals received.

The hashing (S1202) is to hash the extracted bits to generate multiple hashing indices.

The universal Bloom filter searching (S1204) is to search for the bit-vector values indexed by the multiple hashing indices respectively in the universal Bloom filter.

The universal multi-hashing table searching (1206) is to search node information indexed by the multiple hashing indices respectively in the universal multi-hashing table depending on the search result of the universal Bloom filter searching (S1204).

The step of updating best matching prefix (S1208) is to update the best matching prefixes based on node information if they exist that matches the extracted bits of the bit extracting (S1200).

In the access level controlling (S1210), one of multiple levels is selected as an access level unless the access level corresponding to an access length is the last level following the search results of the universal Bloom filter searching (S1204) or the universal multi-hashing table searching (1206) and a predefined sequence of the levels, outputting a control signal for directing the access length that corresponds to the selected access level.

In providing output value (S1212), the updated best matching prefix through the updating step (S1208) is outputted eventually if the access level corresponding to the access length is the last level.

The above described hashing (S1202) incorporates the steps of generating codes with a uniform length from the bits extracted in the bit extracting (S1200) and generating multiple hashing indices from the generated codes.

The universal multi-hashing table searching (1206) performs only in the case where, through the searched bit-vector values in the universal Bloom filter searching (S1204), the extracted bits in the bit extracting (S1200) are found to be included in the entries of the universal multi-hashing table, thereby searching for the node information indexed by the multiple hashing indices respectively on the universal multi-hashing table.

The access level controlling (S1210) responds through the searched bit-vector values in the universal Bloom filter searching (S1204) to whether the extracted bits in the bit extracting (S1200) are found to be absent from the entries of the universal multi-hashing table, thereby selecting the next shorter one of multiple levels as an access level based on a predefined sequence of the levels and outputting a first control signal for directing an access length corresponding to the selected access level.

Also, if the searched node information in the universal multi-hashing table searching (1206) does not include node information that matches the extracted bits in the bit extracting (S1200), the access level controlling (S1210) selects the next shorter one of the multiple levels as an access level based on a predefined sequence of the levels and outputs a second control signal for directing an access length corresponding to the selected access level.

To the contrary, if the searched node information in the universal multi-hashing table searching (1206) has node information that matches the bits from the bit extracting (S1200), the access level controlling (S1210) selects the next longer one of the multiple levels as an access level based on a predefined sequence of the levels and outputs a third control signal for directing an access length corresponding to the selected access level.

As described above, if one of the first, second, and third control signals is outputted, it is inputted in the bit extracting (S1200) to extract bits from the stored IP address in accordance with an access length as directed by the received control signal.

It should be evident from the above description that according to an embodiment of the present disclosure, there is no need to implement the Blooms filters and hashing tables for each prefix length, but rather a single universal Bloom filter and a single universal multi-hashing table permit the efficient IP address lookup from the substantially reduced demand for the memory.

Also, according to an embodiment of the disclosure, the universal Bloom filter is used to judge the necessity of an access to the universal multi-hashing table that can be precluded in order to reduce the accesses substantially resulting in a faster and more efficient IP address lookup.

Also, according to an embodiment of the disclosure, the universal Bloom filters and the universal multi-hashing tables are so utilized that the memory demand and their access number are reduced substantially and the improved speed and efficiency extend beyond the IPv4 scheme to the IPv6.

The IP address lookup apparatus 100 according to an embodiment of the present disclosure and the lookup method by the apparatus 100 will undergo a performance evaluation below to visualize the effects recited.

In the instant performance evaluation of the IP address lookup, the test was performed with 1069 different IPv6 routing data and randomly extracted 100 and 500 different data from the 1069, and since the prefixes that are present in the actual IPv6 routing table have the maximum length of 128 bits, two connected 64-bit CRC generators were employed in the test.

TABLE 3

| NO OF PREFIX (N) | NO OF NODE | N | TABLE SIZE | NO OF OVERFLOW | MEMORY USAGE (kbyte) |
| --- | --- | --- | --- | --- | --- |
| 100 | 160 | 128 | $2^7$ | 0 | 9.13 |
|  |  | 256 | $2^8$ | 0 | 18.25 |
| 500 | 1422 | 1024 | $2^{10}$ | 0 | 73 |
|  |  | 2048 | $2^{11}$ | 0 | 146 |
| 1069 | 3383 | 2048 | $2^{11}$ | 2 | 146 + 2-entry TCAM |
|  |  | 4096 | $2^{12}$ | 0 | 292 |

Shown in the above Table 3 are the numbers of the overflows that occur depending on the sizes of the universal Bloom filter and the universal multi-hashing table.

In Table 3, the numbers of the nodes are greater than those of the prefixes in the prefix group due to the required inclusion of the entire data of the prefix nodes, marker nodes, and BMP nodes generated by the binary search-on-levels architecture. And, in Table 3, the overflow numbers and memory usage are displayed with the number of the buckets of the universal multi-hashing table set to $2^b$ (where b is the greatest integer smaller than or equal to $\log_2 N$) and $2^B$ (where B is the smallest integer greater than or equal to $\log_2 N$).

In the respective prefix groups, almost the entire node information is stored in the universal multi-hashing table, and it can be seen that the number of the entries and the number of the overflows are in a trade-off relation.

Figure 13:
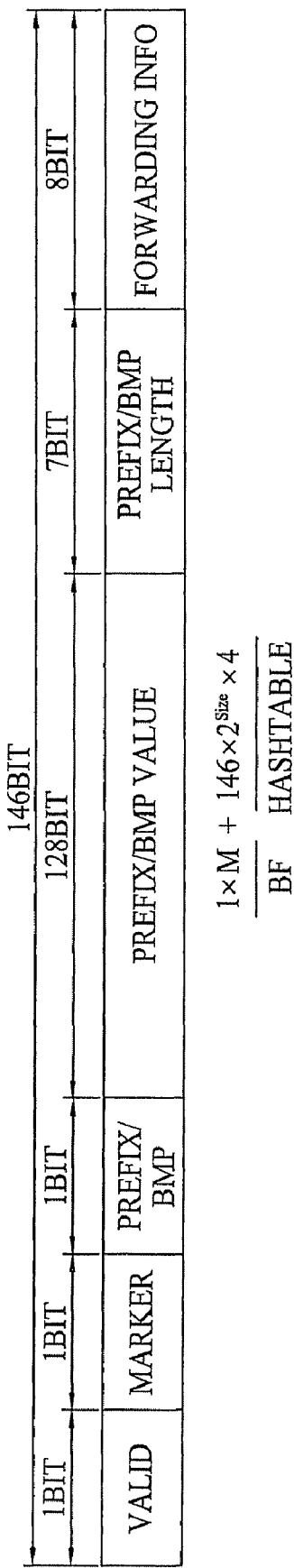
FIG. 13 illustrates entry architecture of a universal multi-hashing table and a method of calculating the memory usage for a universal Bloom filter and the universal multi-hashing table.

FIG. 13 illustrates the entry structure of the universal multi-hashing table and a method to calculate the memory usage for the universal Bloom filter and the universal multi-hashing table.

Most routers existing in the networks demand a faster Internet address lookup performance and thus ask more of the memory access number than the memory capacity. Therefore, it can be seen that in the proposed architecture of the present disclosure increasing the size of the universal multi-hashing table to reduce the overflows causes an increase of the memory demand but displays a super fast lookup performance over the conventional architecture. Multi-hashing has been reportedly showing the recognized perfect hashing performances, and in the routing table on IPv6 scheme either there is a little concern of an overflow surge.

Figure 14:
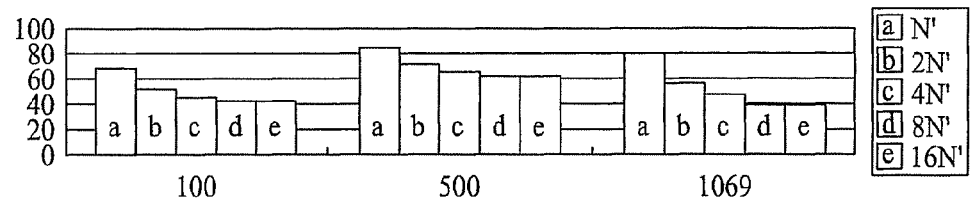
FIG. 14 illustrates a performance test result of the rate of access to the universal multi-hashing table in relation to the size of the universal Bloom filter.

Through the following Table 4 and FIG. 14 to illustrate a performance test result of the rate of access to the universal multi-hashing table in relation to the size of the universal Bloom filter it is possible to see the performance of the IP address lookup apparatus according to an embodiment of the present disclosure.

In the Table 4 and FIG. 14, the number of the buckets of the universal multi-hashing table for example is set as $N'=2^B$ (where B is the smallest integer greater than or equal to $\log_2 N$) and the universal Bloom filter is incrementally sized along N', 2N', 4N', 8N', 16N' over the course of the experiment.

a binary search on levels (BSL), binary search tree (BST), and a binary search on range (BSR). The BSL to compare here does not include the presently disclosed universal Bloom filter.

Since this binary search on levels needs to access to an external memory for every level with a prefix present therein, in the proposed architecture of the present disclosure the number of accesses to the universal Bloom filter is preferably considered in the comparison. The presently disclosed archi-

TABLE 4

| NO OF PREFIX (N) | NO OF NODE | N | NO OF ACC LEVEL | UNI. BLOOM. FILTER | | | UNI. MULT. HASH TABLE | | | HASH TABLE ACCESS RATE (%) |
|---|---|---|---|---|---|---|---|---|---|---|
| | | | | SIZE | BTmax | BTavg | SIZE | HTmax | HTavg | |
| 100 | 160 | 256 | 11 | N | 4 | 3.09 | $2^8$ | 4 | 2.10 | 67.96 |
| | | | | 2 N | | | | 4 | 1.60 | 51.78 |
| | | | | 4 N | | | | 4 | 1.40 | 45.31 |
| | | | | 8 N | | | | 4 | 1.30 | 42.07 |
| | | | | 16 N | | | | 4 | 1.28 | 41.42 |
| 500 | 1422 | 2048 | 17 | N | 5 | 4.77 | $2^{11}$ | 5 | 4.05 | 84.91 |
| | | | | 2 N | | | | 5 | 3.38 | 70.86 |
| | | | | 4 N | | | | 5 | 3.07 | 64.36 |
| | | | | 8 N | | | | 5 | 2.97 | 62.26 |
| | | | | 16 N | | | | 5 | 2.93 | 61.43 |
| 1069 | 3383 | 4096 | 23 | N | 5 | 4.20 | $2^{12}$ | 5 | 3.34 | 79.52 |
| | | | | 2 N | | | | 5 | 2.40 | 57.14 |
| | | | | 4 N | | | | 5 | 1.97 | 46.90 |
| | | | | 8 N | | | | 5 | 1.67 | 39.76 |
| | | | | 16 N | | | | 5 | 1.64 | 39.05 |

In the above Table 4, BTmax means the maximum probing times of the universal Bloom filter and BTavg the average access number to the Bloom filter. Also, Tmax represents the maximum probing times of the universal Bloom filter and HTavg stands for the average access number to the universal hashing table.

The percentage hashing table access rate (%) is the rate of the access number to the universal multi-hashing table versus the access number to the universal Bloom filter. The bigger the universal Bloom filter becomes, lower the access rate of the hash table gets meaning the ascending capacity of the universal Bloom filter sees a reduction in the false positives. Thus, as the universal Bloom filter increases in size, unnecessary accesses to the universal multi-hashing table will be saved further as shown.

Figure 15:
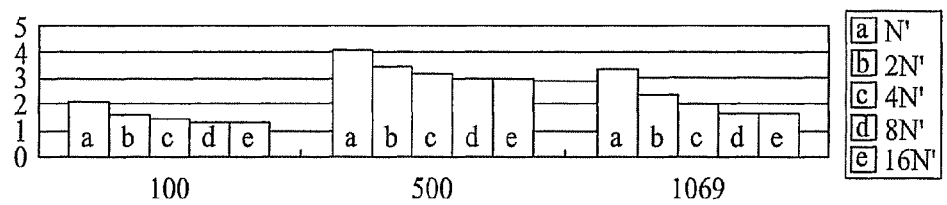
FIG. 15 illustrates a performance test result of the average number of accesses to the universal multi-hashing table in relation to the size of the universal Bloom filter.
Figure 16:
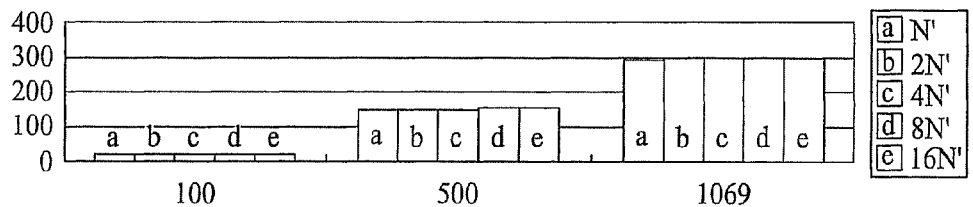
FIG. 16 illustrates a performance test result of the memory demand in relation to the size of the universal Bloom filter.

FIGS. 15 and 16 illustrate at the increasing size of the universal Bloom filter the average number of memory accesses of the proposed architecture of the present disclosure and the memory demand, respectively.

In FIG. 15 showing a performance test result of the average number of accesses to the universal multi-hashing table in relation to the size of the universal Bloom filter, it is clear that as the universal Bloom filter gets bigger with the accompanied filtering capacity enhancement the accesses to the universal multi-hashing table are reduced.

Also, FIG. 16, a performance test result of the memory demand in relation to the size of the universal Bloom filter shows the size of the universal Bloom filter has a little influence on the overall memory demand.

Figure 17:
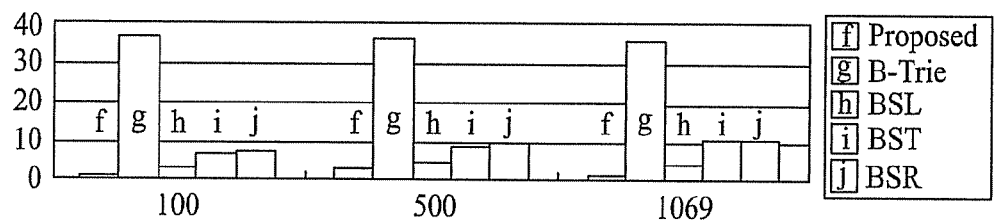
FIG. 17 is a graph for comparing the proposed architecture of the present disclosure to the conventional tree architecture-based algorithm in the number of memory accesses.

FIG. 17 is a graph comparing the proposed architecture of the present disclosure against the conventional tree architecture-based algorithm in the number of memory accesses wherein the number of the buckets of the proposed architecture is set to $N'=2^b$ (where b is the greatest integer smaller than or equal to $\log_2 N$) and the universal Bloom filter is sized 16N'. Other conventional algorithms to compare with the proposed architecture as in FIG. 17 may include a binary trie (B-Trie), tecture is advanced in the lookup performance over the conventional binary search on levels. Graphically proved is the 29-fold performance leap from the compared other conventional algorithms ascertaining the presently disclosed architecture is better suited to the IPv6 scheme.

Figure 18:
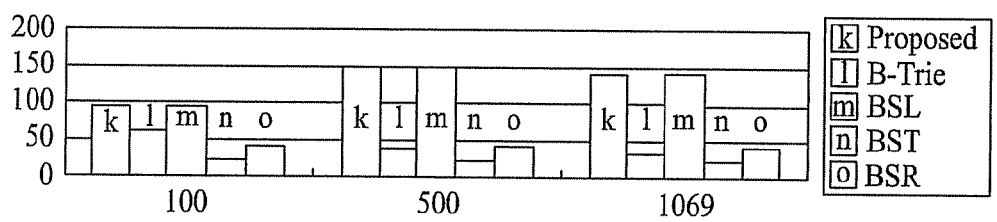
FIG. 18 is a graph for comparing the proposed architecture of the present disclosure in the memory demand per prefix to the conventional tree architecture-based algorithm.

FIG. 18 is a graph for comparing in the memory demand per prefix to the conventional tree architecture-based algorithm wherein the number of the buckets of the proposed architecture of the present disclosure is set to $N'=2^b$ (where b is the greatest integer smaller than or equal to $\log_2 N$) and the universal Bloom filter is sized 16N'. Although it is shown that the memory demand of the present architecture amounts up to seven times what the conventional tree architecture-based algorithm requires, the significance is with the average memory access number (rate) rather than the memory demand considering the fact that in the actual router the packet forwarding speed never catches up the link speed.

In Table 5 below, the proposed architecture in the disclosure is compared with the conventional hashing-based algorithms in the number of overflows with $N'=2^B$ (where B is the smallest integer greater than or equal to $\log_2 N$). Referring to Table 5, it is evident that the proposed architecture and the parallel multi-hashing architecture are common in that their prefixes are stored in the main table but the parallel hashing architecture has 798 prefixes out of the 1069-prefix group failed to be stored in the main table and instead entered the sub-table.

TABLE 5

| NO OF PREFIX (N) | NO OF NODE | PROPOSED | PARALLEL HASH | PARALLEL MULT. HASH |
|---|---|---|---|---|
| 100 | 160 | 0 | 39 | 0 |
| 500 | 1422 | 0 | 356 | 0 |
| 1069 | 3383 | 0 | 798 | 0 |

Figure 19:
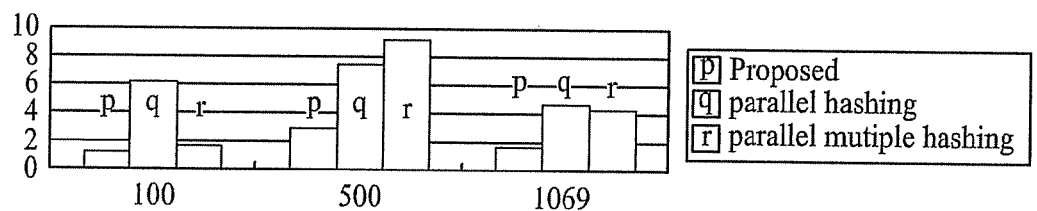
FIG. 19 is a graph for comparing the proposed architecture of the present disclosure in the average number of accessing the memory to the conventional hashing-based algorithm.

FIG. 19 is a graph for comparing in the average number of accessing the memory against other conventional hashing-based algorithm wherein the number of the buckets of the proposed architecture of the present disclosure is set as N'=$2^B$ (where B in the smallest integer greater than or equal to $\log_2 N$) and the Bloom filter is sized 16N'. In the case of conventional parallel hashing and parallel multiple hashing, the comparison was made with the bucket number set as N'=$2^B$ (where B=$\log_2 N$). Also, to compare under the same condition for other conventional hashing-based algorithms, the lookup performance was measured in the binary searching on levels not the parallel process. Specifically, the prefix node, marker node, and BMP node information generated in FIG. 6 were stored in the respective architectures, and the access levels were determined in the binary searching through each level. The result shows the proposed architecture performing search 1.6-5.7 times faster than the other architectures.

Figure 20:
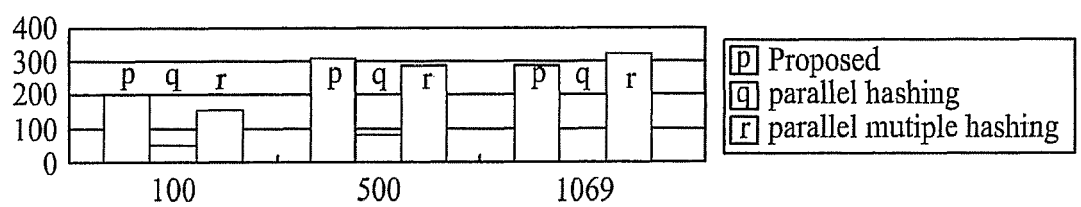
FIG. 20 is a graph for comparing the proposed architecture of the present disclosure in the amount of memory demand per prefix to the conventional hashing-based algorithm.

FIG. 20 is a graph for comparing the memory demand per prefix to the conventional hashing-based algorithm.

Referring to FIG. 20, the proposed architecture of the present disclosure was compared against the conventional hashing-based algorithm in the memory demand with the number of the buckets of the proposed architecture set as N'=$2^B$ (where B is the smallest integer greater than or equal to $\log_2 N$) and the universal Bloom filter sized 16N', and with the number of the buckets of the conventional hashing-based algorithms set as N'=$2^B$ (where B is the smallest integer greater than or equal to $\log_2 N$). It is evident from FIG. 20 comparison that with the 1069 prefixes the proposed architecture is in between the conventional parallel hashing and parallel multi-hashing algorithms in memory demand, but due to the fact that in the cases of parallel hashing a greater number of prefixes are stored in the sub-tables before being subjected to the binary searching to cause degradations of the lookup performance, the proposed architecture of the present disclosure is superior toward the IPv6 address lookup.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Also, every one of the components may be implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. As the computer readable media, the candidates include magnetic recording media, optical recording media, and carrier wave media.

Also, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes. Accordingly, the scope of the disclosure is not to be limited by the above embodiments but by the claims and the equivalents thereof.

What is claimed is:

1. An IP address lookup apparatus including a processor and memory, and, memory, the IP address lookup apparatus comprising:
 a bit extractor, having IP addresses inputted and stored therein, for extracting bits from the stored IP address depending on an access length directed by a control signal upon each receipt of the control signal;
 a hashing section for hashing the extracted bits to generate multiple hashing indices;
 a universal Bloom filter lookup section for searching in a universal Bloom filter to look for a bit-vector value indexed by each of the multiple hashing indices;
 a universal multi-hashing table lookup section, depending on the search result of the universal Bloom filter lookup section, to search for node information indexed by each of the multiple hashing indices in a universal multi-hashing table;
 a best matching prefix updater for updating a best matching prefix based on an existing node information when there exists a searched node information that matches the extracted bit;
 an output generator for generating an updated best matching prefix as an output value when an access level corresponding to an access length is the last one of multiple levels; and
 an access level controller for selecting one of the multiple levels as an access level and outputting the control signal directing an access length corresponding to the selected access level to the bit extractor based on the search result from the universal Bloom filter lookup section or the universal multi-hashing table lookup section and in a predefined sequence of the levels, when the access level is not the last level.

2. The IP address lookup apparatus in claim 1, wherein the hashing section comprises a code generator for generating codes having a uniform length from the extracted bits; and
 a hashing index generator for generating the multiple hashing indices from the generated codes.

3. The IP address lookup apparatus in claim 1, wherein the universal Bloom filter lookup section searches among bit-vector values stored in the universal Bloom filter for a bit-vector value indexed by each of the multiple hashing indices, and wherein the searched bit-vector value is information for determining whether the extracted bit is included in an entry of the universal multi-hashing table.

4. The IP address lookup apparatus in claim 1, wherein the universal multi-hashing table lookup section is allowed into the universal multi-hashing table to search for the node information indexed by each of the multiple hashing indices only when the bit-vector values searched by the universal Bloom filter lookup section represent that the extracted bits are determined as being included in the entry of the universal multi-hashing table.

5. The IP address lookup apparatus in claim 1, wherein the best matching prefix updater stores the node information in existence as the best matching prefix when the node information in existence is the node information of the prefix node, thereby updating the best matching prefix.

6. The IP address lookup apparatus in claim 1, wherein when the extracted bits are not found included in the entry of the universal multi-hashing table through the bit-vector values searched by the universal Bloom filter lookup section, the access level controller selects among the multiple levels the subsequent shorter one as the access level based on a predefined sequence of the levels and outputs a first control signal for directing the access length corresponding to the selected access level;

when there is none of the searched node information by the universal multi-hashing table lookup section matching the extracted bits, the access level controller selects among the multiple levels the subsequent shorter one as the access level based on a predefined sequence of the levels and outputs a second control signal for directing the access length corresponding to the selected access level; or when there exists any one of the searched node information by the universal multi-hashing table lookup section matching the extracted bits, the access level controller selects among the multiple levels the subsequent longer one as the access level based on a predefined sequence of the levels and outputs a third control signal for directing the access length corresponding to the selected access level.

7. The IP address lookup apparatus in claim 1, further comprising an overflow table lookup section to search for node information that matches the extracted bits on an overflow table when there is none of the searched node information by the multi-hashing table lookup section matching the extracted bits, or when the universal multi-hashing table lookup section failed to find the node information indexed by each of the multiple hashing indices in the universal multi-hashing table.

8. The IP address lookup apparatus in claim 7, wherein when the node information is found matching the extracted bits in the overflow table, the access level controller selects among the multiple levels the subsequent longer one as the access level based on a predefined sequence of the levels and outputs a fourth control signal for directing the access length corresponding to the selected access level, or when the node information that matches the extracted bits is not found in the overflow table, the access level controller selects among the multiple levels the subsequent shorter one as the access level based on a predefined sequence of the levels and outputs a fifth control signal for directing the access length corresponding to the selected access level.

9. An IP address lookup method comprising:
extracting bits from stored IP addresses depending on an access length directed by the control signal upon each receipt of a control signal while having the IP addresses inputted and stored;
hashing the extracted bits to generate multiple hashing indices; searching a universal Bloom filter for a bit-vector value indexed by each of the multiple hashing indices; searching for node information indexed by each of the multiple hashing indices depending on the search result of the universal Bloom filter searching;
updating a best matching prefix based on the existing node information when a node information matching the extracted bit exists among the searched node information;
generating an updated best matching prefix as an output value, when an access level corresponding to the access length is the last level; and
selecting one of the multiple levels as an access level and outputting the control signal directing an access length corresponding to the selected access level, based on the search result from the universal Bloom filter searching or the universal multi-hashing table searching and in a predefined sequence of the levels, when the access level is not the last level.

10. The IP address lookup method in claim 9, wherein the hashing comprises generating codes having a uniform length from the extracted bits and generating the multiple hashing indices from the generated codes.

11. The IP address lookup method in claim 9, wherein the universal multi-hashing table searching begins on the universal multi-hashing table to search for the node information indexed by each of the multiple hashing indices only when the bit-vector values searched by the universal Bloom filter searching represent that the extracted bits are determined as being included in the entry of the universal multi-hashing table.

12. The IP address lookup method in claim 9, wherein when the extracted bits are not found included in the entry of the universal multi-hashing table through the bit-vector values searched by the universal Bloom filter searching, the access level controlling selects among the multiple levels the subsequent shorter one as the access level based on a predefined sequence of the levels and outputs a first control signal for directing the access length corresponding to the selected access level;

when there is none of the searched node information by the universal multi-hashing table searching matching the extracted bits, the access level controlling selects among the multiple levels the subsequent shorter one as the access level based on a predefined sequence of the levels and outputs a second control signal for directing the access length corresponding to the selected access level; or when there exists any one of the searched node information by the universal multi-hashing table searching matching the extracted bits, the access level controlling selects among the multiple levels the subsequent longer one as the access level based on a predefined sequence of the levels and outputs a third control signal for directing the access length corresponding to the selected access level.

13. The IP address lookup method in claim 12, wherein the bit extracting includes receiving one of the first, second, and third control signals to extract a bit from the stored IP address in accordance with an access length as directed by the received control signal.

* * * * *